(12) United States Patent
Akiyama

(10) Patent No.: US 6,259,534 B1
(45) Date of Patent: *Jul. 10, 2001

(54) PRINTING APPARATUS HAVING A MEMORY MANAGEMENT SYSTEM

(75) Inventor: Takao Akiyama, Chiba (JP)

(73) Assignee: Seiko Instruments Inc. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/314,131

(22) Filed: Sep. 28, 1994

(30) Foreign Application Priority Data

Sep. 29, 1993 (JP) .................................................. 5-243222

(51) Int. Cl.$^7$ ........................................................ G06F 3/00
(52) U.S. Cl. ........................................ 358/1.16; 358/1.15
(58) Field of Search ........................ 395/115, 101, 395/116, 113, 164, 108, 112; 358/296, 1.16, 1.17, 1.18, 1.1, 1.15; 347/237

(56) References Cited

U.S. PATENT DOCUMENTS

| | | | | |
|---|---|---|---|---|
| 4,835,549 | * | 5/1989 | Sanejima et al. ........................ | 346/76 |
| 5,115,493 | * | 5/1992 | Jeanblanc et al. ..................... | 395/116 |
| 5,131,078 | * | 7/1992 | Ikenoue .................................. | 395/112 |
| 5,133,610 | * | 7/1992 | Sukigara ................................. | 400/54 |
| 5,189,521 | * | 2/1993 | Ohtsubo et al. ........................ | 358/296 |
| 5,220,645 | * | 6/1993 | Nakajima ............................... | 395/113 |
| 5,239,621 | * | 8/1993 | Brown, III et al. ................... | 395/115 |
| 5,241,397 | * | 8/1993 | Yamada .................................. | 358/296 |
| 5,266,968 | * | 11/1993 | Stephenson ............................ | 346/76 |
| 5,268,993 | * | 12/1993 | Ikenoue et al. ........................ | 395/112 |
| 5,287,434 | * | 2/1994 | Bain et al. ............................. | 395/101 |
| 5,290,110 | * | 3/1994 | Takahashi .............................. | 400/121 |
| 5,295,233 | * | 3/1994 | Ota ........................................ | 395/115 |
| 5,335,316 | * | 8/1994 | Toyokura ............................... | 395/115 |
| 5,341,471 | * | 8/1994 | Yamazaki et al. .................... | 395/164 |

* cited by examiner

Primary Examiner—Steven Sax
(74) Attorney, Agent, or Firm—Adams & Wilks

(57) ABSTRACT

A printing apparatus comprises a printing mechanism for performing a plurality of printing operations, a controller for controlling the plurality of printing operations in accordance with a predetermined control program, and a memory connected to the controller for storing printing data. The controller comprises a memory management system for randomly dividing the memory into a plurality of memory blocks, for randomly and exchangeably assigning a usage to each of the memory blocks corresponding to a predetermined user application, and for storing printing data corresponding to a predetermined user application in each of the memory blocks. The memory management system permits many types of user-defined characters and/or graphics corresponding to a predetermined user application to be stored in a comparatively limited memory capacity resulting in an overall decrease in component cost for the printing apparatus.

17 Claims, 4 Drawing Sheets

JAN 13

CODE 39

ITF

PRINTING APPARATUS HAVING A MEMORY MANAGEMENT SYSTEM

BACKGROUND OF THE INVENTION

This invention relates to a printing apparatus having a memory management system and to a memory management method which randomly changes the layout of data and usage of a READ/WRITE memory (a memory which can be read and written) included in a printing apparatus. The printing apparatus is used as an output terminal for a computer and comprises, as a general structure, a printing mechanism for performing printing operations, control means for controlling the printing operations of the printing mechanism in accordance with a predetermined control program, and a READ/WRITE memory connected to the control means.

In accordance with different needs and uses of printing apparatus, many kinds of application programs for the printing apparatus have become requisite, and users of the printing apparatus may wish to have certain functions added and/or altered, such as the addition and/or alteration of recording media for user defined characters (which are arbitrarily defined by users) and/or graphic character, which lead to the expansion of the memory or mass storage system.

However, in conventional memory management methods for printing apparatus, there are cases in which general purpose applications installed in the printing apparatus do not meet the particular needs of users who require special purpose functions.

Conventionally, a printing apparatus requiring special applications is manufactured with custom-made applications in which special purpose functions and/or data are pre-installed in the memory of the printing apparatus.

However, the manufacture of printing apparatus with custom-made applications has resulted in an increase in manufacturing costs for the manufacturer and higher retail costs for the user.

A proposed solution to the foregoing problems has been to expand the memory or introduce many storage memories in the printing apparatus for the general purpose applications into which as much data or as many application programs as possible are stored.

However, since the expansion of memory or introduction of a mass storage memory results in an increase in production cost of the printing apparatus, users who do not need to use a printing apparatus with special program functions suffer from the foregoing disadvantage of high retail costs to an extent where the competitiveness of the printing apparatus may disappear.

In conventional memory control systems, a part of the memory area is dedicated for a specific application, such as, for example, for application programs, for character data, or for graphic data. As a result, the total size of the memory must be increased, even though only a function is added or altered. Additionally, usually most users who wish to have customized specifications are satisfied with only additional special functions. Therefore, the expansion of the memory or the introduction of a mass storage memory usually results in dead area practically left unused in the memory.

SUMMARY OF THE INVENTION

An object of the present invention is to provide a printing apparatus having a memory management system and method that meets the divergent needs of users without the need for expansion of the memory or the introduction of a mass storage memory in the printing apparatus.

In order to attain this and other objects, the printing apparatus according to the present invention comprises a printing mechanism for performing printing operations, control means for controlling the printing operations in accordance with a predetermined control program, and a READ/WRITE memory connected to the control means, the READ/WRITE memory having a memory area for storing miscellaneous information necessary for the printing operations. The control means has memory management means which can randomly divide the memory area into a multiple number of memory blocks and randomly and exchangeably assign a usage to each of the memory blocks corresponding to a predetermined user application, and store miscellaneous information corresponding to a predetermined user application to any of the blocks. The READ/WRITE memory stores such miscellaneous information as printing data in the form of a user-defined character or graphic character, bar-code printing program, etc. according to a user's need. As may be understood according to the examples given above, the miscellaneous information is given as the data or as the program. A non-volatile memory can be used as the READ/WRITE memory. In this case, the miscellaneous information registered in the READ/WRITE memory is retained whether the power of the printing apparatus is ON or OFF. On the other hand, a volatile memory can also be used as the READ/WRITE memory. In this case the miscellaneous information is loaded from a host computer via an input interface only when the power of the printing apparatus is switched ON.

DETAILED DESCRIPTION OF THE PREFERRED EMBODIMENT

Figure 1:
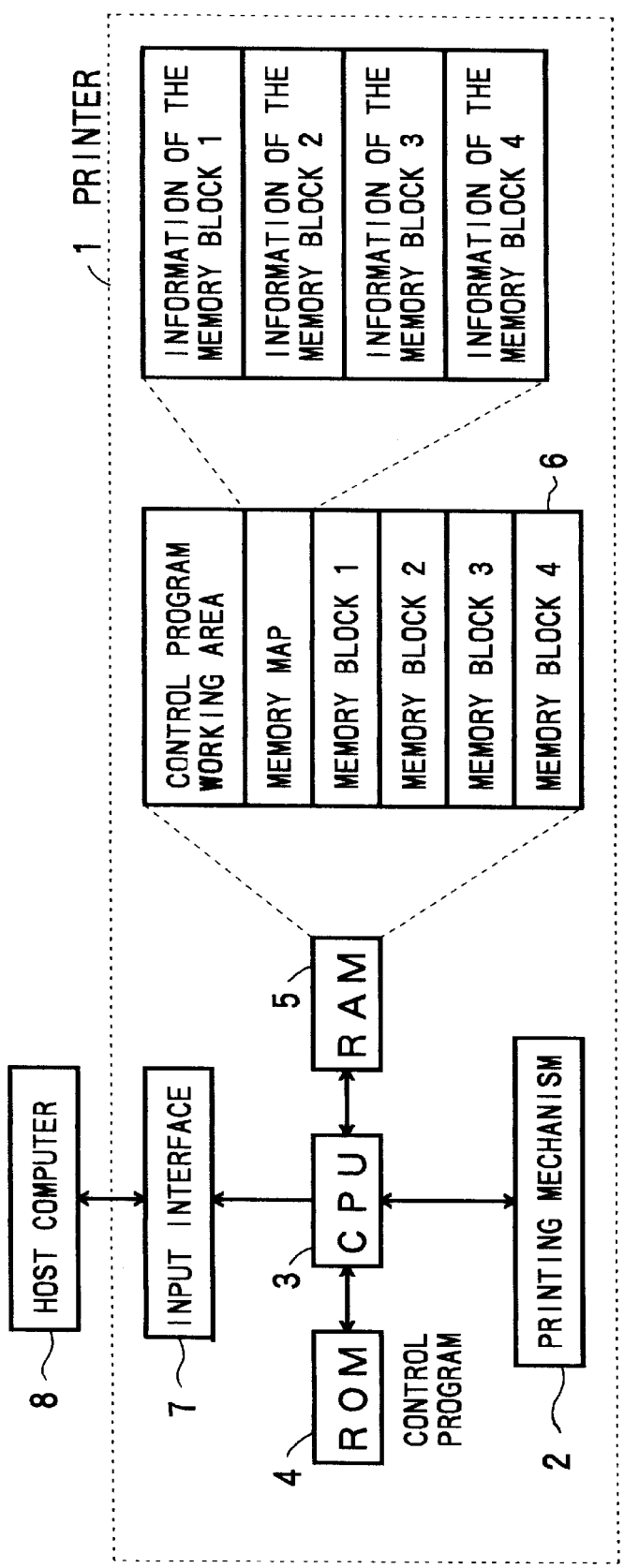
FIG. 1 is a functional block diagram of the printing apparatus according to the present invention.

Hereinafter, a preferred embodiment of this invention will be explained in detail referring to the drawings.

FIG. 1 shows a functional block diagram of a basic construction of the printing apparatus according to the present invention. As shown in the drawing, the printing apparatus 1 comprises a printing mechanism 2 for performing printing operations and control means for controlling the printing activities of the printing mechanism 2 in accordance with a predetermined control program. In the present embodiment, the control means comprises a CPU 3, and the predetermined control program is stored in a ROM 4 by a previous storing process.

A READ/WRITE memory is connected to the CPU 3 and comprises a RAM 5 in the present embodiment. The RAM 5 has a memory area 6 for storing miscellaneous information necessary for printing operations and such information is supplied from a host computer 8 via an input interface 7. The CPU 3 comprises memory management means for randomly dividing the memory area 6 into a multiple number of memory blocks. In the present embodiment, the memory area 6 is divided into four memory blocks.

The size of each memory block can be randomly determined. The memory management means can randomly assign a selected miscellaneous function (or application) to each memory block, and can randomly store miscellaneous information into each memory block according to the selected function (or application). For example, miscellaneous information may be stored into each memory block pertaining to a particular function (or application) such as printing data of a user-defined character, printing data of a graphic character, a printing program for bar codes, etc.

The memory area 6 comprises a control program working area, the above-described memory blocks and a memory map. The working area is utilized as a register when the control program is executed. Into the memory map is stored information on the size and/or the function (or application) of each memory block which is arbitrarily defined. READ and WRITE of the data and the program in the memory blocks is managed by making reference to the memory map.

Figure 2:
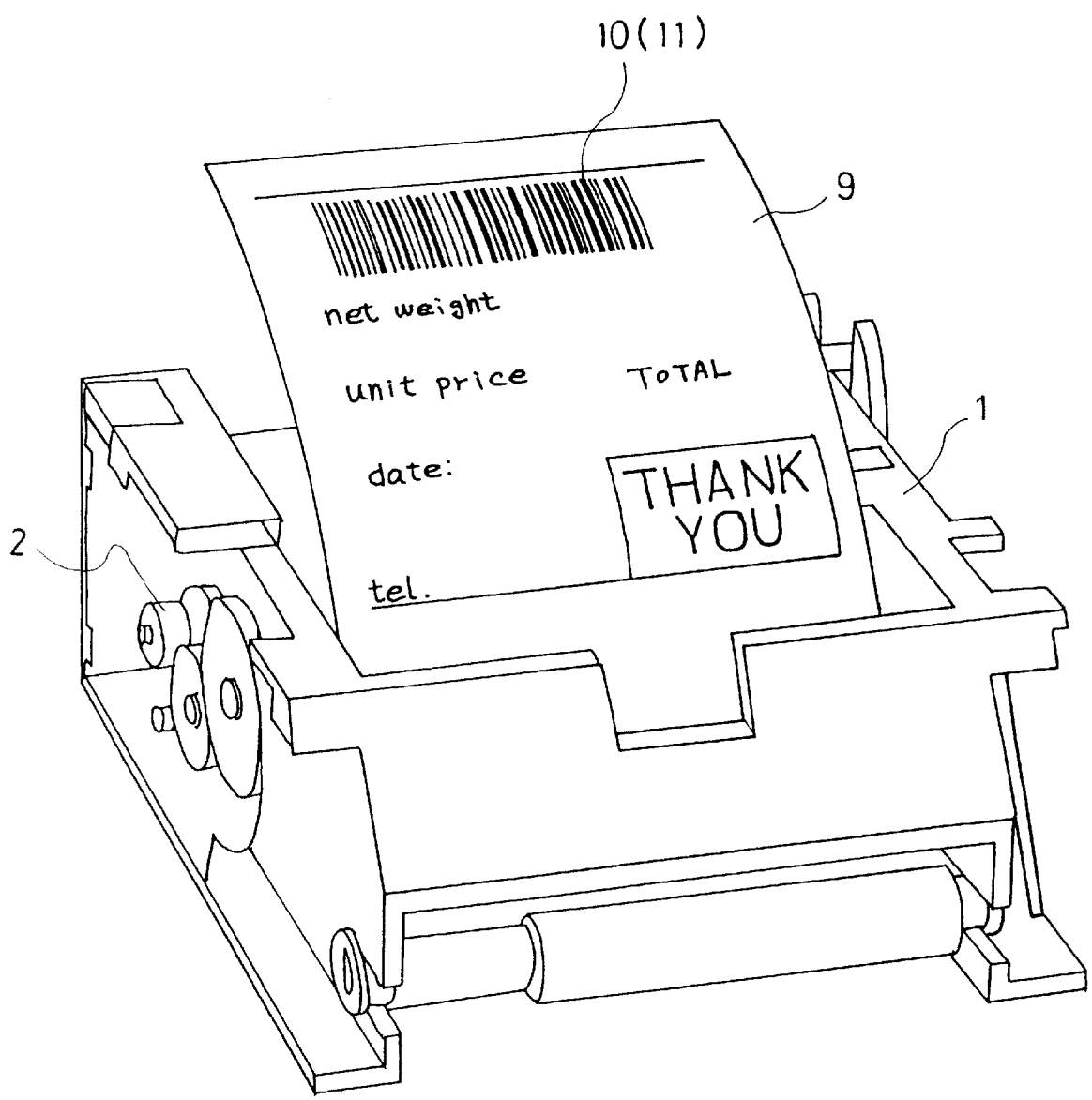
FIG. 2 is a perspective view of the printing mechanism assembled into the printing apparatus according to the present invention.

FIG. 2 is a perspective view of a printing apparatus according to this invention. In this embodiment, a thermal printer is used as the printing mechanism 2. Bar-codes 10 and graphics 11, which are self-designed by the user, are printed on a recording paper 9.

In this embodiment, the program for printing the bar-codes 10, the printing data for graphics 11, etc. are stored into the corresponding memory blocks of the memory area 6.

A non-volatile memory can be used as the READ/WRITE memory. In this case, any stored data can be retained regardless of whether the power of the printing apparatus is ON or OFF. On the other hand, a volatile memory may be used instead of the non-volatile memory, in which case the entry of any information should be made from the host computer 8 via the input interface 7 while the power of the printing apparatus is switched ON.

Figure 3:
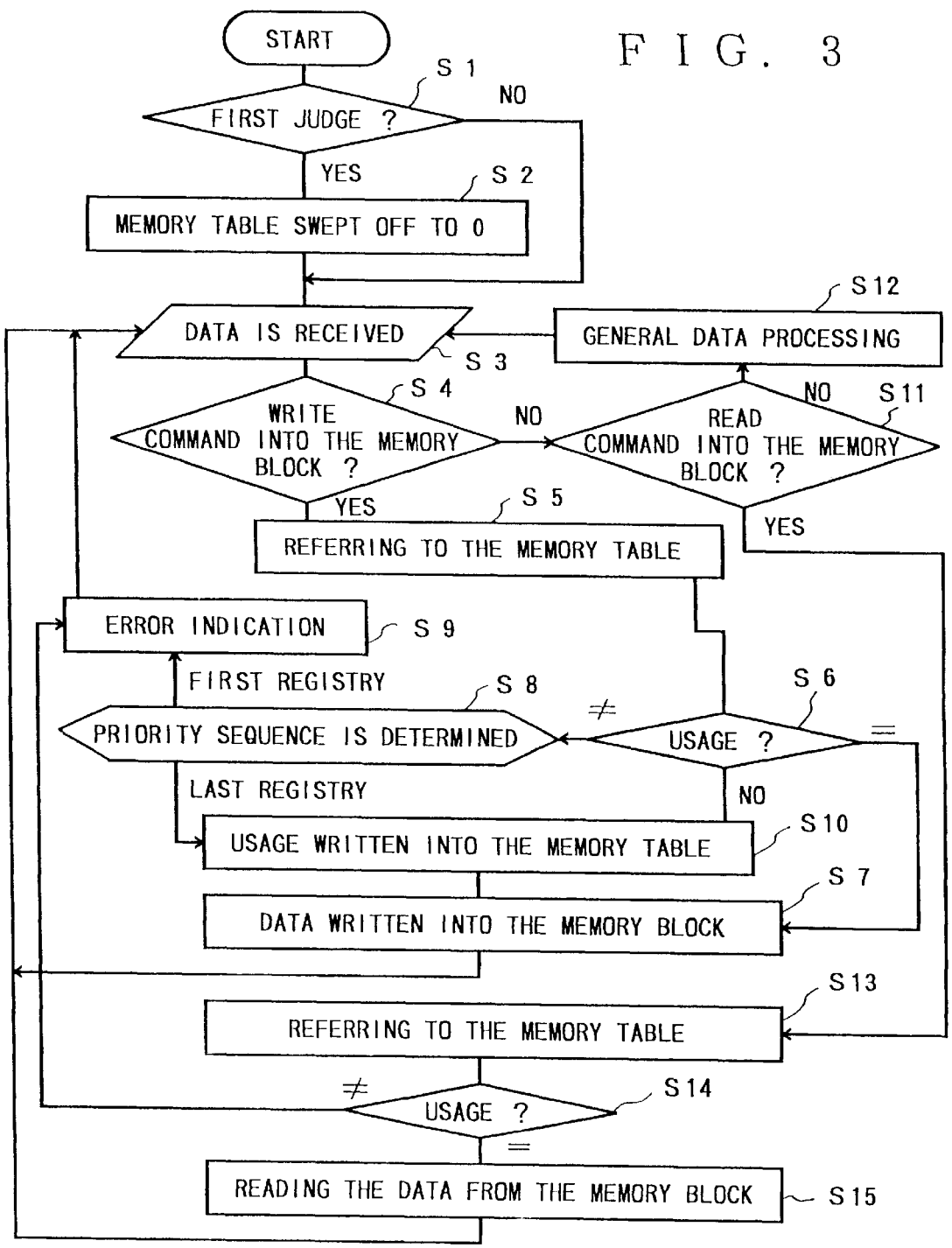
FIG. 3 is a flowchart explaining the activity of the printing apparatus according to the present invention.

Next, the operation of the printing apparatus according to the present invention will be explained in detail referring to the flow chart in FIG. 3 and the block diagram in FIG. 1.

As described above, a part of the READ/WRITE memory area 6 is divided into several memory blocks to each of which a specific function (or application) is randomly assigned. According to the present invention, the random function can be freely altered in order that a limited capacity of the memory area 6 is effectively utilized. In order that a different function (or application) may be assigned to each of the memory blocks and that different information may be written into it, the memory map (memory table) is provided in addition to the memory blocks.

After the printing apparatus is turned ON, it is at first judged at step S1 whether to perform initialization of the printing apparatus.

If it is judged to perform initialization, all the initial values of the memory table are swept off to zero at the step S2. This status signifies that the printing apparatus has not been used yet.

Next, at the step S3, predetermined data is received from the host computer 8 via the input interface 7.

Next, at the step S4, it is judged whether the data received includes a WRITE command into the memory block or not. If a WRITE command is included, it proceeds to the step S5.

At the step S5, the memory blocks to be written into aria chosen by referring to the memory table based on the memory block code included in the WRITE command.

Next, at the step S6, it is identified if the application code included in the WRITE command coincides with the usage (or application) information assigned to the memory block selected. If the application code included in the WRITE command coincides with the usage assigned to the memory block selected, the predetermined data or program is written into the memory block selected at the step S7.

In case that there is no coincidence, a priority sequence is determined at the step S8. This priority sequence includes two kinds of priority, one for the first registry and one for the last registry, one of which should be chosen by the user beforehand.

In the case of a priority for the first registry, an error indication step is performed at the step S9. That is, in the case of a priority for the first registry, the application code included in the WRITE command is assumed to be an error and a predetermined WARNING message is outputted. In this case, neither the data nor the program is written into the selected memory block.

In the case of a priority for the last registry, the application code defined as a WRITE command is written into the memory table, as shown in step S10. That is, even though a selected memory block is already allotted to a certain usage, such usage in the selected memory block above can be arbitrarily altered from time to time by inputting another application code via a WRITE command.

Next, as shown at step S7, a predetermined data or program is written into the selected memory block. But in case that the memory table is cleared off at the step S2 mentioned above, the inputted application code is not written into any memory block yet. Then a "not used yet" reading is given, since neither coincidence nor discordance in the application code can be judged in the step S6. In this case, proceeding to the step S10, the application code inputted with the WRITE command is written down into the memory table. That is, by selecting the memory block by WRITE command at the initial condition and by inputting the application code, random assignment of the memory block is possible. That is, in case that a memory block selected for the registration of the application code has not been used, the information assigned is written down into the memory table. Then at the step S7 a predetermined data or program is written into the selected memory block.

Returning to the step S4, the step diverges to the step S11 if it is judged that a WRITE command has not been included in the data received. In step S11, it is judged whether a READ command has been included in the data received in step S3. In case that a READ command has not been included, the process forwards to step S12 where general routine data processing related to printing operations is conducted. In case that a READ command has been included, the process forwards to step S13 where the appropriate memory block is selected by referring to the memory table based on the block designation code included in the READ command.

Next, forwarding to the step S14, it is judged whether the application code included in the READ command coincides with the usage assigned to the selected memory block. In case that there is no coincidence, that is, in case that the memory block which is the object of the READ command is already being used for other usage, the process forwards to the step S9 where the error indication step is conducted and the READ command is assumed ineffective. In case that there is coincidence in usage, the process forwards to the step S15, where there is a reading of a predetermined data or program from the selected memory block, and the process then returns to the step S3. The coincidence judgement process of usage at step S14 described above is for the purpose of avoiding such inconveniences as printing of unnecessary data or the unnecessary processing of the program.

A concrete example of a preferred embodiment of the printing apparatus in this invention is described below.

With most printing apparatus, users can store the characters or graphics they design themselves. Since the memory capacity for such character font and/or graphics data is usually significantly large, it results in a longer printing time during storage of such data.

Therefore, in the case of a printing apparatus with stored characters and/or graphics, the storing is usually done at the initiating stage, and subsequent printing of such data is done by referring to and reading such stored data for the purpose of shortening the printing time.

Many users wish to register a few or several kinds of characters and/or graphics which requires an increased memory capacity. This causes an increase in component cost, which is disadvantageous for many users who do not require storage of such user-defined characters and/or graphics as described above. In fact, only a minority of users require different kinds of user-defined characters and/or graphics. Therefore, in applying the present invention to the foregoing printing apparatus, many kinds of user-defined characters and/or graphics can be stored to a comparatively limited memory capacity by dividing the total memory area into several blocks and by designing each memory block so that either character or graphics can be registered to any specific block.

The foregoing operation is conducted as follows:

First, the total memory area is divided into several memory blocks, and on the RAM is set the memory table to which reference to each memory block can be made to determine if the input data is defined as either user-defined characters, or user-defined graphics, or not defined at all.

Second, data of user-defined characters and/or graphics are input into the printing apparatus using WRITE commands.

Thereafter, the CPU 3 of the printing apparatus processes the WRITE command and stores the input data to the selected memory block if it is determined that such memory block is assigned to the same usage or that it has not been used yet. Otherwise, the CPU 3 ignores the WRITE command because double usage might occur if the selected memory block is written into. Once all the data transfer of user-defined characters and/or graphics to the unused memory blocks has been completed, the CPU 3 stores the memory table thus defined.

If a non-volatile memory (e.g., a flush memory) is used for the storage of user-defined characters and/or graphics, users can use such characters and/or graphics anytime only with a READ command (printing command) once they are stored, since they are held in memory even after the power of the printing apparatus is switched OFF. When a user does not use many kinds of such characters and/or graphics, the graphic data should be written from the top of the total memory area towards the bottom thereof. On the other hand, the character data should be written from the bottom of the total memory area towards the top, or vice versa, in order to avoid double usage of the memory block.

Lastly, another embodiment of the printing apparatus in accordance with this invention will be explained hereunder which relates to the printing apparatus with the additional function of the bar code sets.

As shown in FIG. 4, there exists many kinds of bar code sets depending on the use required. Different types of character formats of the bar codes are used for the same date number (for example, 123456789012) as described below.

Figure 4A:
FIGS. 4A, B, C are explanatory drawing showing different kinds of bar-codes.
Figure 4B:
Figure 4C:

FIG. 4A shows the bar code of a JAN-13 format, FIG. 4B shows the bar code of a CODE 39 format, and FIG. 4C shows the bar code of an ITF format. As described above, the printing type for the same date number is different depending on the format selected. Typically, however, a user only uses one kind of bar code. Therefore conventional printing apparatus which can print the bar codes is limited to only printing of several sets of the bar code of the type which are for universal use because almost all users use only universal types of bar codes.

It is not realistic to provide a printing apparatus which can support all miscellaneous types of bar codes since a large memory capacity is necessary for storing such miscellaneous types of bar code sets. Therefore, those who wish to use bar codes different from universal types have to order a custom-made printing apparatus of which the firmware may be changed for custom use. However, custom-made printing apparatus suffer from disadvantages of disbursement for development, high costs, and/or increase in inventory. Furthermore, the fewer the number of orders for custom-made printing apparatus the more significant the foregoing disadvantages become.

The present invention overcomes the foregoing disadvantages in the prior art by allowing additional set(s) of the bar code to be added into the printing apparatus in order to meet the needs of different users with respect to use of universal bar codes.

That is, with the present invention the disadvantages associated with cost increase due to the inclusion of many types of bar code sets can be avoided. Furthermore, with the provision of a non-volatile writable memory, such as a RAM, which does not lose its memory upon switching the power OFF, the bar code printing program may be stored via the input interface.

The procedure for the above is as follows:

First, the printing program for additional bar code printing is transferred to the internal memory of the printing apparatus via the input interface. In this program, storage into the memory area is arranged to be made from the top of the memory area towards the bottom thereof.

Next, with the completion of the transfer of the printing program, the CPU of the printing apparatus registers to the memory table the specific memory block which is used for the storage of the bar code printing program.

Thereafter, for the printing of newly stored bar codes, newly designated values are given to the commands which designate the bar codes in the bar code printing command. When the printing characters of the new bar codes are assigned, the CPU of the printing apparatus checks with the memory table for the purpose of avoiding double use of a memory block in case of no registry in the program above and ignores the bar code printing command if such a program is not registered yet.

Lastly, the CPU of the printing apparatus shifts the address for processing to the top of the memory area where it stores the new bar code printing program and then prints the bar codes. When non-volatile memory which can be written into is used as a memory to which the new bar code is registered, only a bar code printing command is enough to print the new bar code which can be printed any time since the content in the memory is not erased even though the power has been turned OFF. Therefore, the same performance level achieved by custom-made printing apparatus can be realized by a general purpose printing apparatus according to the present invention.

As described above, according to the present invention, the memory area inside the printing apparatus is randomly divided into a multiple number of memory blocks of which the use of each block can randomly be changed and to which miscellaneous information can randomly be stored according to the use of the memory blocks which may be randomly designated.

Therefore, according to the present invention, even the limited capacity of the memory in a general purpose printing apparatus can effectively and efficiently meet miscellaneous needs of users.

What is claimed is:

1. A printing apparatus comprising: printing means for performing a plurality of printing operations; a memory for storing printing data; and control means for controlling the plurality of printing operations performed by the printing means in accordance with a predetermined control program, the control means being connected to the memory and having memory management means for selectively reconfiguring the memory in response to user commands for randomly dividing the memory into a plurality of user-defined memory blocks, for exchangeably assigning a usage to each of the memory blocks based on user commands so that each memory block may be assigned to be used exclusively by one of a plurality of predetermined user applications, and for storing printing data corresponding to the respective predetermined user applications to the respective memory blocks, thereby allowing different applications to be run simultaneously and the printer to be used simultaneously for more than one application.

2. A printing apparatus as claimed in claim 1; wherein the memory comprises a READ/WRITE memory.

3. A printing apparatus according to claim 2; wherein the printing data stored by the READ/WRITE memory comprises at least one of user-defined character data, user-defined graphic data and a bar code program.

4. A printing apparatus according to claim 2; wherein the READ/WRITE memory comprises a non-volatile memory capable of storing printing data irrespective of whether a supply of electrical power to the printing apparatus is ON or OFF.

5. A printing apparatus according to claim 2; wherein the READ/WRITE memory comprises a volatile memory in which printing data input from a host computer via an input interface is stored only when a supply of electrical power to the printing apparatus is ON.

6. A printing apparatus according to claim 2; wherein the READ/WRITE memory includes means for storing information on at least one of the storage size and the type of user application stored in each of the memory blocks.

7. A printing apparatus according to claim 1; wherein the printing means comprises a thermal printer.

8. A printing apparatus according to claim 1; wherein the printing data stored by the memory comprises at least one of user-defined character data, user-defined graphic data and a bar code program.

9. A printing apparatus according to claim 1; wherein the memory includes means for storing information on at least one of the storage size and the types of user application stored in each of the memory blocks.

10. A printing apparatus according to claim 9; wherein the printing data stored by the memory comprises at least one of user-defined character data, user-defined graphic data and a bar code program.

11. A printing apparatus according to claim 9; wherein the printing means comprises a thermal printer.

12. A printing apparatus according to claim 1; wherein the control means is connected to host a computer to receive user commands for reconfiguring the memory and for receiving printing data from the host computer, the printing data having associated therewith a block code for indicating the memory block to which the printing data is to be stored.

13. A memory management method for a printing apparatus having printing means for performing printing operations corresponding to predetermined user applications and a memory for storing printing data corresponding to the predetermined user applications, the memory management method comprising the steps of: randomly dividing the memory into a plurality of memory blocks in response to user commands; exchangeably assigning a usage to each of the memory blocks based on user commands so that each memory block is assigned to be used exclusively in connection with one of a plurality of predetermined user applications; and storing printing data corresponding to a respective predetermined user application in each of the memory blocks, thereby allowing different applications to be run simultaneously and the printer to be used simultaneously for more than one application.

14. A memory management method as claimed in claim 13; wherein the storing step includes the storage of printing data comprising at least one of user-defined character data, user-defined graphic data and a bar code program.

15. A memory management method as claimed in claim 14; further including the step of storing information in the memory corresponding to at least one of the storage size and the type of user application stored in each of the memory blocks.

16. A memory management method as claimed in claim 13; further including the step of storing information in the memory corresponding to at least one of the storage size and the type of user application stored in each of the memory blocks.

17. A memory management method according to claim 13; wherein the step of storing printing data comprises the steps of receiving printing data from a host computer, the printing data having associated therewith a block code for indicating the memory block to which the printing data is to be stored, and storing the printing data into the memory block indicated by the block code.

* * * * *